United States Patent [19]

Srivastava

[11] 3,882,534

[45] May 6, 1975

[54] GATED AUTOMATIC TINT CONTROL CIRCUIT

[75] Inventor: Gopal Krishna Srivastava, Amherst, N.Y.

[73] Assignee: GTE Sylvania Incorporated, Stamford, Conn.

[22] Filed: July 20, 1973

[21] Appl. No.: 381,251

[52] U.S. Cl. .......................................... 358/28
[51] Int. Cl. .......................................... H04n 9/12
[58] Field of Search .................. 178/5.4 HE; 358/28

[56] References Cited

UNITED STATES PATENTS

| | | | |
|---|---|---|---|
| 3,654,384 | 4/1972 | Kresock | 178/5.4 HE |
| 3,663,744 | 5/1972 | Harwood | 178/5.4 HE |
| 3,688,019 | 8/1972 | Weitzsch et al. | 358/28 X |
| 3,715,472 | 2/1973 | McTaggart | 178/5.4 HE |
| 3,740,459 | 6/1973 | Okada | 178/5.4 HE |
| 3,780,218 | 12/1973 | Rennick | 178/5.4 HE |
| 3,783,186 | 1/1974 | Slavik et al. | 178/5.4 HE |
| 3,816,846 | 6/1974 | Nero et al. | 358/28 |

*Primary Examiner*—Robert L. Griffin
*Assistant Examiner*—Mitchell Saffian
*Attorney, Agent, or Firm*—Norman J. O'Malley; Thomas H. Buffton; Cyril A. Krenzer

[57] ABSTRACT

Flesh tones of reproduced images in a color television receiver are enhanced by a gated automatic tint control circuit which includes first and second color demodulators each coupled to a chrominance signal source and to a phase shift network which is in turn coupled to a reference oscillator signal source. A switching means coupled to the phase shift network is also coupled to the output of one of the color demodulators. The switching means alters the phase shift network and the phase angle of the signals applied to the demodulators from the reference oscillator signal source in accordance with the output from one of the color demodulators. The television signal also includes the usual synchronization and high voltage deflection circuitry and a DC restorer circuit couples the horizontal deflection circuitry to the switching means. Thus, flesh tone enhancement and phase shifting of the reference oscillator signals is effected upon activation of the switching means in response to an output signal from one of the color demodulators.

8 Claims, 2 Drawing Figures

Fig. 2

GATED AUTOMATIC TINT CONTROL CIRCUIT

BACKGROUND OF THE INVENTION

Generally, present day color television receivers include circuitry for selective modification of hue signals by a viewer to effect a desired flesh tone response. Factually, a relatively constant flesh tone response is automatically provided in most present day television receivers without any undue attention or adjustment by a viewer.

Specifically, many forms of hue compensation circuitry for flesh tone enhancement include apparatus for phase shifting a chrominance signal applied to the color demodulator stages. For example, U.S. Pat. No. 3,525,802 entitled "Hue Expander Circuit" issued Aug. 25, 1970 in the name of P. J. Whiteneir, Jr. provides apparatus for automatically shifting signals in the red and yellow sections of the chrominance diagram in a manner which provides a hue representative of flesh tone.

In another known form of hue compensation apparatus, chrominance signals are shifted by a phase shift network of passive components series connected to a chrominance signal source. Such apparatus appears on pages 104 and 105 of an article entitled "Solid State Controls Head New Color TV Lineup" in the June 1970 edition of Electronics. Thus, relatively inexpensive passive components are substituted for relatively expensive active components in an effort to provide the desired enhanced flesh tone control.

In still another form of hue compensation apparatus U.S. Pat. No. 3,654,384 entitled "Apparatus for Modifying Electrical Signals" issued Apr. 4, 1972 in the name of John M. Kresock, suggests hue modification circuitry wherein the phase angles of the reference signal applied to the demodulators as well as the magnitudes thereof are altered to effect an improved flesh tone reproduction. Thus, a shift in phase separation of the demodulation axes as well as a change in the magnitude of the reference signals applied to the two demodulators provides a desired shift in flesh tone.

Although the above-mentioned systems have been and still are widely accepted in present day color television manufacture, it has been found that each leaves something to be desired. For example, systems which include active components are relatively expensive and appear to be more subject to catastrophic failure than circuits with passive components.

Also, circuitry employing passive components wherein the desired flesh tone region appears to be enhanced at reduced cost of has components and an increased reliability has found somewhat undesirable in image reproductive capabilities. More specifically, it has been found that circuitry wherein the R—Y and B—Y reference axes are shifted to an angle greater than 90° tend to provide an image response wherein green signals appear blue rather than green due to the shift in the output of the B—Y demodulator from a negative to a positive value. Obviously, such an undesired shift in color response is deleterious to truly authentic and desired image reproduction capabilities.

OBJECTS AND SUMMARY OF THE INVENTION

An object of the present invention is to provide enhanced hue modification circuitry for a color television receiver. Another object of the invention is to provide improved color response in a color television receiver.

Still another object of the invention is to provide apparatus for altering the phase angle of signals applied to a pair of color demodulators from a reference signal oscillator in accordance with the polarity of the output signal from one of the modulator circuits. A further object of the invention is to provide switching means for altering the phase of the signals applied to the demodulators in accordance with the output of one of the demodulators. A still further object of the invention is to provide DC restoration means coupled to a switching means whereby phase shift of reference oscillator signals applied to demodulators is controlled and determined by the polarity of the output signal from one of the demodulators.

These and other and further objects, advantages and capabilities are achieved in one aspect of the invention by a gated tint control circuit having first and second demodulators coupled to a chrominance signal source and to a phase shift network which is, in turn, coupled to a reference oscillator signal source. A switching means is coupled to the phase shift network and to the output of one of the demodulators whereby a shift in the output from one of the demodulators effects a shift in the switching means altering the phase shift network such that the phase angle of the signals applied to the demodulators from the reference oscillator signal source are altered. Thus, enhanced flesh tones are observed by the viewer in accordance with a predetermined output signal from one of the demodulator circuits.

PREFERRED EMBODIMENT OF THE INVENTION

For a better understanding of the present invention, together with other and further objects, advantages and capabilities thereof, reference is made to the following disclosure and appended claims in conjunction with the accompanying drawings.

Figure 1:
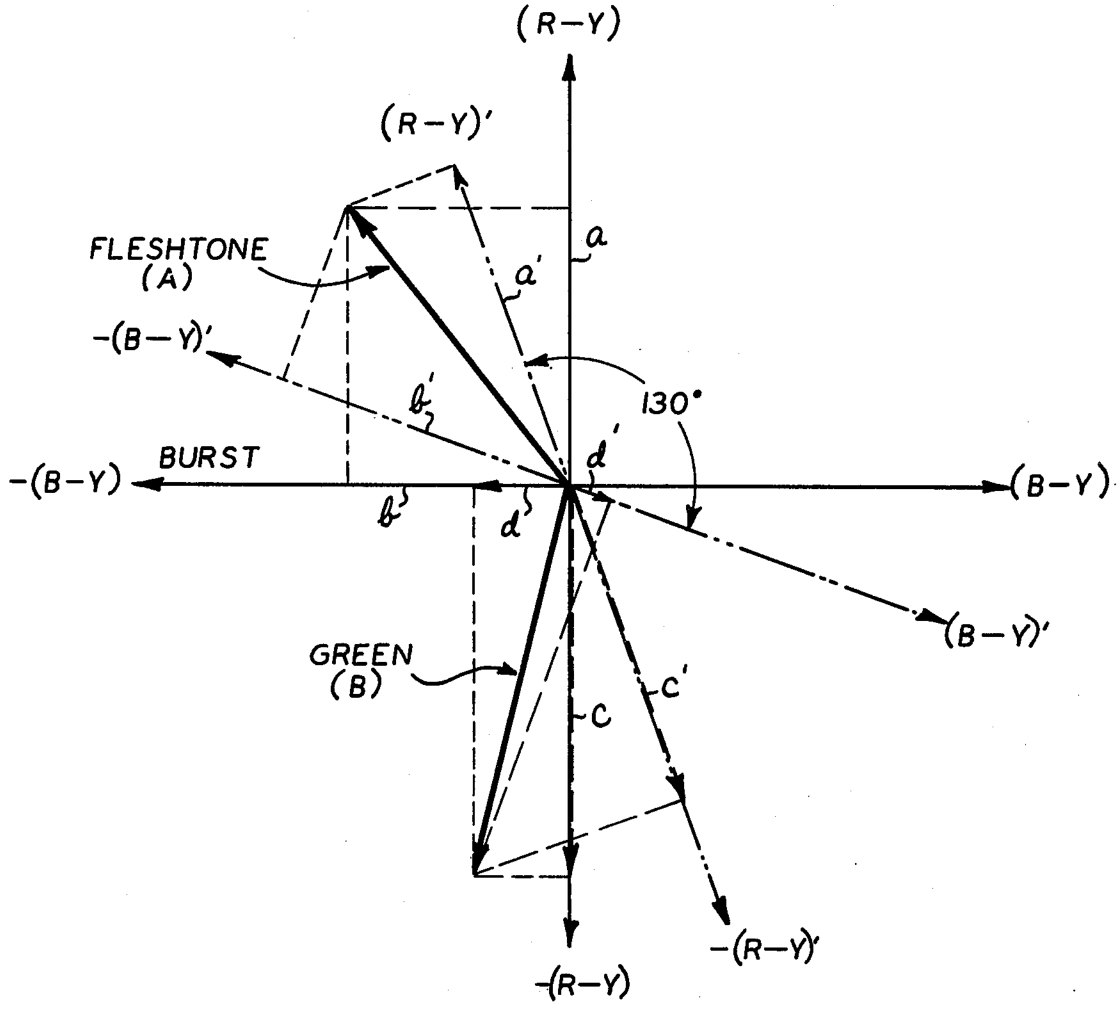
Fig. 1 PRIOR ART
FIG. 1 is a chromaticity diagram to facilitate an understanding of the prior art.

Referring to the prior art chromaticity drawing of FIG. 1, a first reference or R—Y signal available from the reference oscillator signal source is normally depicted as lagging a color burst signal by a phase angle of 90°. Also, a second reference signal or B—Y signal is normally depicted as lagging the color burst signal by a phase angle of 180°. Thus, normal operation provides a first reference signal R—Y lagging burst by 90° and a second reference signal B—Y lagging burst by 180° and lagging the first reference signal by 90°.

To illustrate the effect of the phase shift network normally employed in flesh tone or hue modification circuitry, it may be assumed that the normal phase shift network is altered. Thereupon, the R—Y and B—Y reference signals are shifted to a positional location, indicated as (R—Y)′ and (B—Y)′ having an increase phase angle therebetween which is preferably in the range of about 130° as compared with the previous 90°.

Assuming a vector "A" representative of a fleshtone on the phase diagram, there would be provided a positive-going R—Y vector component represented as *a* and a negative-going B—Y vector component represented as *b*. Moreover, alteration of the phase shift network to enhance flesh tones causes a shift in the phase angle intermediate the R—Y and B—Y vector components from the above-mentioned 90° value to an angle of about 130°. Thereupon, the new R—Y vector component *a'* remains positive-going while the new B—Y vector component *b'* remains negative-going. Thus, the polarity of the R—Y and B—Y vectors remains unchanged and the desired fleshtone feature is attained.

However, assuming a vector "B" represents the color green on the phase diagram, there would be a negative-going R—Y vector component represented as *c* and a negative-going B—Y vector component represented as *d*. Upon alteration of the phase shift network to enhance flesh tones, the phase angle shifts from 90° to about 130° whereupon the negative-going R—Y vector component *c* remains as a negative-going component *c'* while the negative-going B—Y component *d* shifts to a positive-going component *d'*. Thus, the previously-mentioned vector B representative of the color green now undesirably appears as a bluish color due to the shift in the B—Y vector component *d* from a negative-going value to a positive-going value *d'*. As a result, it can be seen that, while it is desirable to shift R—Y and B—Y reference signals to increase the phase angle therebetween to 130° for fleshtone colors represented by vector A, it is undesirable to do so for other colors like green, represented by vector B.

Figure 2:
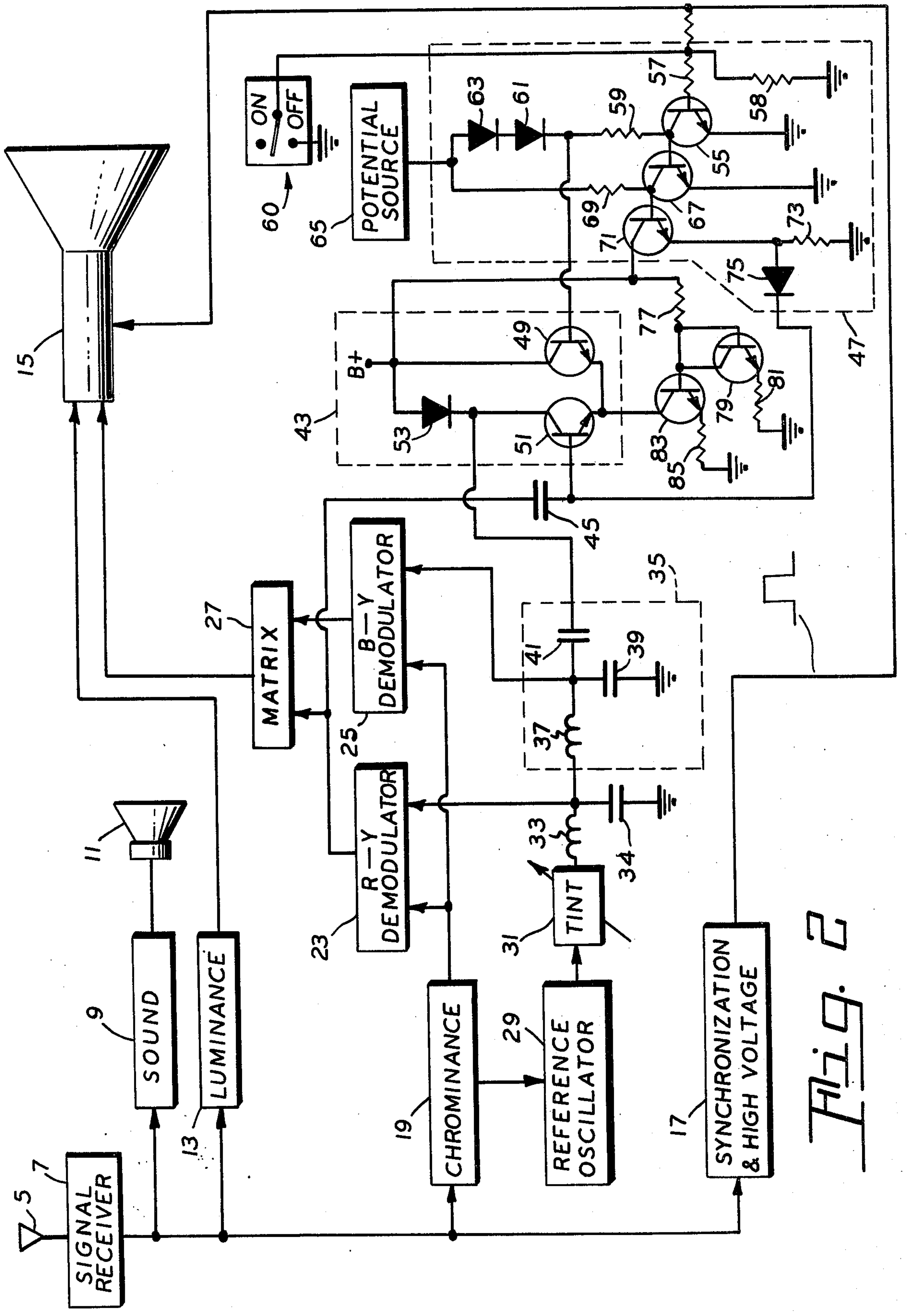
FIG. 2 is a diagrammatic illustration, in block and schematic form, of a color television receiver including a preferred embodiment of the present invention.

Referring to FIG. 2 of the drawings, a color television receiver includes an antenna 5 coupled to a signal receiver 7 having the usual RF, IF, oscillator and mixer stages. The signal receiver 7 provides one output which is applied to a sound channel 9 coupled to a loudspeaker 11 for providing audio information.

Another output from the signal receiver 7 is applied to a luminance channel 13 which, in turn, is coupled to a cathode ray tube or image reproducer 15. Thus, luminance signals representative of monochrome or brightness information are applied to the picture tube or cathode ray tube 15 in the usual manner. Moreover, an output from the signal receiver 7 is applied to a synchronization and high voltage means 17 which is, in turn, coupled to the cathode ray tube 15.

Still another output from the signal receiver 7 is applied to a chrominance channel 19. The chrominance channel 19 provides signals representative of color information which are applied to a first or R—Y demodulator stage 23 and to a second or B—Y demodulator stage 25. The first and second demodulator stages 23 and 25 respectively, are coupled to a matrix network 27 wherein signals representative of red, green and blue color information are derived and applied to the cathode ray tube 15.

The chrominance channel 19 also provides a color burst signal which is applied to a reference oscillator stage 29 for effecting phase lock of the applied color burst signal and oscillator stage 29. The reference oscillator stage 29 develops reference oscillation signals which are applied to an alterable tint control 31 having an output coupled by an inductor 33 to the R—Y or first demodulator stage 23. A capacitor 34 couples the inductor 33 and R—Y demodulator 23 to a potential reference level.

A phase shift network 35 includes an inductor 37 and a first capacitor 39 coupled to circuit ground. A second capacitor 41 is coupled to the junction of the inductor 37 and first capacitor 39. The phase shift network 35 couples a signal from the junction of the inductor 33 and capacitor 34 via the inductor 37 to the second or B—Y demodulator stage 25. Thus, signals available from the reference oscillation signal source 29 are coupled to the first or R—Y demodulator stage 23 and via the phase shift network 35 to the second or B—Y demodulator stage 25.

A switching means 43 is coupled to the second capacitor 41 of the phase shift network 35 and via a charging capacitor 45 to the output of the first or R—Y demodulator stage 23. Moreover, a DC restoring network 47 couples the output of the synchronization and high voltage development circuitry 17 to the switching means 43 and to the charging capacitor 45.

The switching means 43 is preferably of the electronic type and includes a first transistor 49 having a collector electrode coupled to a potential source B+ and an emitter electrode directly coupled to the emitter electrode of a second electron device 51.

The second electron device 51 has a collector electrode coupled to the second capacitor 41 of the phase shift network 35 and via a diode 53 to the potential source B+. Moreover, the base electrode of the electron devices 49 is coupled to the DC restoring network 47 while the base electrode of the electron device 51 is coupled, via the charging capacitor 45, to the R—Y demodulator 23.

Also, the DC network 47 includes an electron device 55 having an emitter electrode coupled to circuit ground. The base electrode of the electron device 55 is coupled via a resistor 57 to the synchronization and high voltage means 17, via a resistor 58 to circuit ground and to an automatic tint switching means 60. The collector electrode is coupled by series connected resistor 59, first diode 61, and second diode 63 to a potential source 65. Moreover, the collector electrode is also connected via the resistor 59 to the base electrode of the electron device 49 of the switching means 43.

The collector of the electron device 55 is coupled to the base of another electron device 67 having an emitter coupled to the potential reference level. A collector electrode of the electron device 67 is coupled by a resistor 69 to the potential source 65 and to the base of still another electron device 71. The electron device 71 has an emitter electrode coupled to the potential reference level via a resistor 73 and by diode 75 to the charging capacitor 45 and to the base electrode of the electron device 51 of the switching means 43. The collector electrode of the electron device 71 is coupled to the potential source B+ and via a resistor 77 to the base and collector electrodes of a diode-connected electron device 79.

A resistor 81 connects the emitter electrode of the electron device 79 to a potential reference level while the collector and base electrode of the electron device 79 are coupled to the base electrode of a transistor 83. In turn, the emitter electrode of the electron device 83 is coupled by a resistor 85 to the potential reference level and the collector electrode is coupled to the emitter electrodes of the transistors 49 and 51 of the switching means 43.

Thus, the base electrode of the electron device 49 of the switching means 43 is coupled back to the junction of the resistor 59 and diode 61 series connecting the electron device 55 to the potential source 65. Moreover, the electron device 51 of the switching means 43 has a base electrode coupled via the diode 75 to the output of the electron device 71.

As to operation, the reference oscillator stage 29 provides reference oscillation signals to the first or R—Y demodulator stage 23. At the same time, reference oscillation signals from the reference oscillator stage 29 are applied via the phase shift network 35 to the second or B—Y demodulator stage 25. In the usual manner, the reference oscillation signals applied to the first and second demodulator stages 23 and 25 respectively, have a phase shift relationship of 90°. Thus, the reference oscillation signals applied to the first or R—Y demodulator stage 23 lag a burst signal by 90° while reference oscillation signals applied to the second or B—Y demodulator stage 25 lag the burst signal by 180°.

Also, a second capacitor 41 couples the phase shift network 35 to the junction of an electron device 51 and diode 53 of the switching means 43. The electron device 51 and diode 53 are operable in either a conductive or non-conductive state. In the conductive state, the second capacitor 41 is shunted across the first capacitor 39 of the phase shift means 35 to effect a phase angle of about 130° for signals applied to the R—Y and B—Y demodulators 23 and 25. In the non-conductive state, the junction of the electron device 51 and diode 53 forms a high impedance whereat the second capacitor 41 is connected. Therefore, the phase shift means 35 and the phase angle of the signals applied to the R—Y and B—Y demodulators 23 and 25 remains substantially unchanged or normal at about 90°. Thus, conduction of the electron device 51 effects a phase angle of about 130° for flesh tone correction while non-conduction of the electron device 51 effects a phase angle of about 90° whereby color rendition remains normal or unchanged.

Further, observation of the vector diagram of FIG. 1 will indicate that vectors representative of colors falling within the range of about +50° and −130° with reference to vector A, will have a positive-going R—Y vector component. Also, vectors representative of colors outside the above-mentioned range will have a negative-going R—Y vector output. Since a vector representative of flesh tones falls within the above-mentioned range, it is desirable to have those colors which can be altered to a flesh tone corrected without a deleterious effect upon those colors which are outside the flesh tone correctable area. Thus, output signals from the R—Y demodulator stage 23 may be employed to control conduction and non-conduction of the electron device 51 and, in turn, control the phase angle of signals applied to the demodulator stages 23 and 25. In other words, a positive-going output from the R—Y demodulator 23 provides conduction of the electron device 51 and a phase angle of about 130° for flesh tone correction while a negative-going output from the R—Y demodulator 23 provides non-conduction of the electron device 51 and a normal unaltered phase angle of about 90° for uncorrected color rendition.

As to control of the electron device 51 to effect conduction in response to positive-going R—Y signals and non-conduction for negative-going R—Y signals, it can be assumed that the R—Y demodulator stage 23 has some quiescent output voltage Vo when no chroma signal is applied thereto. Also, a positive-going R—Y demodulator output may be represented as Vo+(R—Y) while a negative going R—Y demodulator output would be represented as Vo−(R—Y).

Assuming the potential source 65 provides a DC voltage $V_s$, the base electrode of the electron device 49 will be at a potential of about $V_s - 2V_{be}$ or the DC voltages less the voltage drop of the diodes 61 and 63. Also, it is known that there is no output from the R—Y demodulator 23 during the flyback or horizontal retrace period. Thus, the R—Y demodulator 23 provides a quiescent voltage Vo during the horizontal retrace period.

Further assuming that the capacitor 45 is charged, during the horizontal retrace period, to a potential $[(V_s - 2V_{be}) - V_o]$ and this charge is held during the horizontal trace period, the base electrode of the electron device 51 will have a potential $V_s - 2V_{be}$ when the R—Y demodulator is in a quiescent state. A positive-going output potential from the R—Y demodulator will provide a voltage at the base electrode of $(V_s - 2V_{be}) + V_{R-Y}$ while a negative-going output potential provides a voltage at the base electrode of $(V_s - 2V_{be}) - V_{R-Y}$.

A comparison of the potentials at the base electrodes of the electron devices 49 and 51 indicates that the electron device 51 will be in a state of non-conduction when the output from the R—Y demodulator 23 is negative-going. Moreover, at all conditions except for a negative-going output from the R—Y demodulator 23, the electron device 51 will be in a conductive state whereat fleshtone control is in effect.

As to the charging of the capacitor 45 to a desired potential, $[V_s - 2V_{be} - V_o]$, during the horizontal retrace period of about 11 μ sec. and holding this charge during the trace period of about 52 μ sec., it is known that the output of the R—Y demodulator 23 is $V_o$ during the horizontal retrace period. Also, it is known that a potential $V_s - V_{be}$ may be obtained at the emitter electrode of the electron device 71 during the retrace period with a ground potential thereat during the trace period. As can be seen, application of a positive polarity flyback pulse potential from the synchronization and HV circuitry 17 to electron device 55 causes conduction thereof, non-conduction of electron device 67, and conduction of electron device 71.

Upon conduction of the electron device 71, the potential $(V_s - V_{be})$, will appear at the emitter of the electron device 71 and be applied via the forward biased diode 75 to the capacitor 45 during the retrace period to effect charging thereof. Also, the diode 75 is back biased when the electron device 71 is non-conductive and the emitter essentially grounded during the trace period. Thus, the diode 75 presents a low impedance for charging the capacitor 45 and a high impedance to discharge of the capacitor 45.

As a result, it can be seen that the electron device 51 will have a bias potential from the capacitor 45 in an amount of $V_s - 2V_{be}$ when no signal is available from the R—Y demodulator 23, $(V_s - 2V_{be}) + V_{R-Y}$ when the output signal from the R—Y demodulator 23 is positive-going, and $(V_s - 2V_{be}) - V_{R-Y}$ when the output signal from the R—Y demodulator 23 is negative-going. Thus, conduction of the electron device 51 and a shift in phase angle from the normal 90° to about 130° occurs when the output from the R—Y demodulator is either absent or positive-going.

In summary, a positive-going output from the R—Y demodulator stage 23 causes conduction of the electron device 51 of the switching means 43. In turn, conduction of the electron device 51 shunts the second capacitor 41 across the capacitor 39 of the phase shift means 35 which alters the phase angle of the signals applied to the first and second demodulator stages 23 and 25 and enhances flesh tone reproduction.

On the other hand, a negative-going output from the R—Y demodulator stage 23 renders the electron device 51 non-conductive whereupon the second capacitor 41 is coupled to a high impedance. As a result, the phase angle and the phase shift network 35 remain substantially unaltered and true color rendition without flesh tone correction is effected.

While there has been shown and described what is at present considered the preferred embodiment of the invention, it will be obvious to those skilled in the art that various changes and modifications may be made therein without departing from the invention as defined by the appended claims.

What is claimed is:

1. In a color television receiver having chrominance and reference oscillator signal sources, a gated tint control circuit comprising:

first demodulator means coupled to said chrominance and reference oscillator signal sources;

second demodulator means coupled to said chrominance signal source;

phase shift network means coupled to said reference oscillator signal source and to said first and second demodulator means;

bias potential development means coupled to the output of one of said first and second demodulator means and to synchronization and high voltage development means; and switching means coupled to said phase shift network means and to said bias potential development means, said switching means altering said phase shift network to effect alterations in the phase angle of signals applied to said first and second demodulators in accordance with polarity reversal of a signal from said output of said one demodulator means whereby flesh tones are enhanced while green signal response remains substantially unaltered.

2. The gated tint control circuit of claim 1 wherein said bias potential development means is in the form of a charge storage means.

3. The gated tint control circuit of claim 1 wherein said switching means is in the form of a comparator circuit having one electron device coupled to a potential source and a series connected diode and electron device coupled to said output of one of said demodulator means and to said phase shift network means whereby alterations in polarity of a potential from said demodulator means alters said phase shift network to shift the phase angle of signals applied to said demodulator from said reference oscillator signal source.

4. The gated tint control circuit of claim 1 wherein said phase shift network includes an inductor interconnecting said first and second demodulator means, a first capacitor coupling said inductor and second demodulator means to a potential reference level, and a second capacitor coupling said inductor, second demodulator means, and first capacitor to said switching means.

5. The gated tint control circuit of claim 1 wherein said color television receiver includes a synchronization and high voltage development means connected to a DC restorer network including a unidirectional conduction device coupled to said switching means for providing a low impedance to conduction in one direction and a high impedance to conduction in an opposite direction.

6. A gated tint control circuit for a color television receiver having chrominance and reference oscillator signal sources and synchronization and high voltage development circuitry comprising:

first and second demodulator means coupled to said chrominance signal source;

phase shift network means including an inductor coupled to said reference oscillator signal source and to said first and second demodulator means; a first capacitor coupled to said inductor, said second demodulator means, and to a potential reference level; and a second capacitor coupled to said inductor, first capacitor, and said second demodulator means; and switching means coupled to the output of one of said first and second demodulator means and to said phase shift network means for selectively coupling and decoupling said phase shift network and a potential reference level in accordance with polarity reversal of a signal from said output of one of said first and second demodulator means whereby the phase angle of signals applied to said demodulator from said reference oscillator signal sources is altered in accordance with alterations in polarity of said output from said demodulator.

7. The gated tint control circuit of claim 6 including DC restorer means coupled to said synchronization and high voltage development circuitry and to said switching means.

8. The gated tint control circuit of claim 6 wherein said switching means is coupled to a DC restorer means connected to said synchronization and high voltage development circuitry and AC coupled to said output of one of said first and second demodulator means.

* * * * *